UNITED STATES PATENT OFFICE 1,995,752

MANUFACTURE OF HYDROCARBON PRODUCTS CONTAINING OXYGEN

Alfred Schaarschmidt, deceased, late of Berlin-Charlottenburg, Germany, by Erna Magda Irmgard Schaarschmidt, administratrix, Berlin, Germany, assignor to Antares Trust Registered, Vaduz Liechtenstein No Drawing. Application August 5, 1933, Serial No. 683,897. In Germany August 8, 1932

13 Claims. (Cl. 260—134)

This invention relates to a process for producing organic products containing oxygen from hydrocarbons. More particularly, the invention relates to the production of ketone-like products from saturated aliphatic or alicyclic hydrocarbons by reacting the same with carbonyl halide, such as phosgene, in the presence of an aluminum halide and by maintaining the temperature below normal room temperature.

Previously in the prior art an attempt has been made to obtain ketone-like products from hydrocarbons but the results have not been satisfactory or commercially acceptable under all conditions since the products obtained were not pure and chiefly consisted of low quality resinous polymers having a high boiling point.

It was found, however, that by means of the invention as disclosed herein, substantially pure and desirable ketone-like products suitable for use in the perfumery and soap industry, as well as other uses, can be obtained.

This invention also includes the production of desirable ketone-like products from a mixture of hydrocarbon components to obtain the greatest yields therefrom by a series of operations. The operating conditions and reacting components are adapted in such a way that in treating a mixture of hydrocarbons, certain desirable products are first formed by reactions with the hydrocarbons which might normally interfere with the subsequent reactions and production of other desirable products from the remaining hydrocarbons. Thus, not only is obtained the greatest yield of relatively pure and uniform products from a given hydrocarbon starting material, but there is also obtained from a starting mixture of the hydrocarbons increased yields of substantially uniform, pure and desirable ketone-like products from each of the components of a mixture and in a separated state.

In carrying out the reactions, it is of the greatest importance to obtain products of low boiling point, the molecular size of which corresponds to the unaltered molecular size of the starting hydrocarbons without forming secondary condensation into higher molecular or resinous forms which are worthless. It is desirable to direct the operation so that only the primarily formed ketone-like products are obtained. It was found that in operating with low reaction temperatures, that is, temperatures below normal room temperature, and as low as —15° C. or lower, that the possibility of the polymerization to undesirable resinous products of a high boiling-point is avoided and that in operating at these temperatures, substantially only primary valuable ketone-like products will be formed. This phenomena is particularly true when operating upon certain hydrocarbons by means of the specific reacting components as will be later described.

The process is preferably carried out on non-aromatic, that is aliphatic or alicyclic saturated hydrocarbons containig at least one tertiary carbon atom and non-aromatic aliphatic or alicyclic saturated hydrocarbons free from tertiary carbon atoms. These hydrocarbons are obtainable from petroleum, brown coal-tar, cracked products or also synthetically.

In operating with the mixture of hydrocarbons as herein disclosed the process is preferably carried out so as to react first with those hydrocarbons containing tertiary atoms, and subsequently to react upon the more stable hydrocarbons which are free from tertiaries. However, the process is not limited to operations carried out on such a mixture but may be utilized in connection solely with such tertiary containing hydrocarbons or, as disclosed and claimed in copending application Sr. No. 683,898, with such hydrocarbons free from tertiaries.

The first step of the operation consists in reacting upon non-aromatic that is aliphatic or alicyclic saturated hydrocarbons containing at least one tertiary carbon atom with phosgene in the presence of aluminum chloride, while maintaining the temperature of the mixture during the reaction below normal room temperature and preferably at a temperature of between 0 and 5° C. These reacting compounds may be mixed together in corresponding proportions in a closed vessel. This vessel is preferably fitted with a mixing device in order to thoroughly stir the mass to facilitate the reaction. It is also preferably fitted with suitable cooling devices in order that the temperature of the reacting mass may be maintained below normal room temperature and, in some cases, well below 0° C. If the hydrocarbons treated are such as also contain saturated non-aromatic hydrocarbons free from tertiary carbon atoms, these hydrocarbons will be found to be substantially unchanged, and after the reaction is complete, they are drawn off from the reacted products.

The reacted components remaining may then be decomposed by the addition of water or cracked ice and the resulting ethereal oil distilled off by the use of steam and recovered. It will be found that this product is free from resinous polymerized components and is made up of compounds of substantially similar chemical structure. These products consist essentially of ketones and reduction by sodium and alcohol gives substances which can be esterified by acids. Apparently the structure of these products consists of two molecules from the hydrocarbon starting material which are bound together by a single CO group.

The unreacted compounds are found to be very stable chemically and have important uses commercially where such stability is essential. For example, they may be used as solvents, lubricants or as transformer oils, or any similar materials.

The segregated unreacted mass which has previously been drawn off may then be treated to obtain the desired ketone-like products. This material will consist essentially of saturated non-aromatic, that is aliphatic or alicyclic hydrocarbon free from tertiary carbon atoms. It is understood, of course, that the operation about to be described for obtaining ketone-like products from such material may be carried out upon a fresh batch of such material which has previously undergone no chemical separating treatment such as described above. It was found that it is also essential to carry out the reacting operations on this material at temperatures below normal room temperatures and preferably between 0 and 5° C. in order to avoid the production of undesirable resinous polymerized and non-uniform components which are difficult to separate and which prevent the obtaining of a pure product. It was found that such operations can be carried out best and desirable products obtained by reacting upon such material with phosgene in the presence of either aluminum bromide or aluminum iodide which are much stronger catalyzators than aluminum chloride on account of their much greater solubility in hydrocarbons and on account of their greater specific capacity of reaction, while maintaining the temperature below normal room-temperature. It is essential at the low temperature required to apply these stronger and more efficient catalyzators, since the more stable hydrocarbons react only at much higher temperature with aluminum chloride as catalyzator, in which case many worthless resinous products are formed.

The reacting operation can be carried out as described above in connection with the compounds containing tertiary carbon atoms, that is in a closed vessel equipped to permit effective stirring to facilitate the reaction. Cooling means should also be provided. The reacted mass can be decomposed with water and a sweet smelling ethereal oil formed and separated by steam distillation. It was found that the resulting product is substantially pure and free from resins, polymerized components, and other undesirable products.

The following examples will more specifically illustrate the nature of the invention. However, it is not intended that these examples shall limit the scope of the invention for it will be apparent to those skilled in this art that other modifications may be made without departing from the spirit of the invention. Throughout these examples the parts have been given by weight.

Example 1

72 parts of isopentane (2-methyl-butane) are thoroughly mixed with 50 parts of phosgene and 133 parts of anhydrous aluminum-chloride in an autoclave at temperatures of about 0 to +5° C. for about 10-15 hours. The reaction product is further decomposed by ice water, and an ethereal oil is obtained which may be distilled off by the use of steam or vacuum. The oil has the specific gravity of 0.860 and consists probably of diisopentyl-keton $C_5H_{11}$—CO—$C_5H_{11}$ according to the analysis of 77.8% carbon, 12.9% hydrogen and 9.3% oxygen.

Example 2

150 parts of pentane from petroleum consisting of about the same parts of isopentane and n-pentane of a boiling point of 29 to 32° centigrade are intensively stirred with 50 parts of phosgene and 140 parts of anhydrous aluminum chloride within an autoclave, provided with a kneading device, at temperatures of about +5° C. until the phosgene is substantially consumed. The hydrocarbon, which has not reacted and consists mainly of the very resistant n-pentane is then separated from the condensation product. This reaction product is then decomposed by water, and an ethereal oil is obtained, which can be easily distilled off by the use of steam and which boils at about 70 to 80 centigrade at 15 to 25 mm. pressure (mercury). It consists mainly of ketones.

Example 3

100 parts of methylcyclohexane are thoroughly mixed with 50 parts of phosgene and 135 parts of aluminum chloride free from water at temperatures of 0 to +5° centigrade in an autoclave during four hours. After the hydrogen chloride is blown off, ice water is added and the reaction product distilled by steam. 95 parts of a sweet-smelling oil are obtained which consists probably of the ketone $C_{15}H_{26}O$ according to the analysis, by which 81.0% C, 11.3% H and 7.7% O were found.

Example 4

42 parts of cyclohexane are mixed with 25 parts of phosgene and 120 parts of aluminum bromide in an autoclave at a temperature of about −10° C. and, after the autoclave has been closed, the materials are slowly heated to a temperature of up to about +5° centigrade, while the mass is thoroughly stirred up and mixed by a rapidly-running stirrer. This temperature is maintained for about 8 to 12 hours. After the decomposition of the mass by water the reaction product is distilled off by steam. A sweet smelling ethereal oil is obtained which boils at about 80–110° centigrade (20–30 mm. mercury).

Example 5

84 parts of cyclohexane are treated with 50 parts of phosgene free from water and 400 parts of aluminum iodide in an autoclave at a temperature of about 0° C. by intensive mixing with a stirrer for 4 to 6 hours. The hydrogen iodide which is developed is blown off, and the reaction product is decomposed by ice water. 80 parts of a sweet smelling oil is obtained by steam distillation. The oil boils at 80°–110° C. (30 mm. mercury) and contains mainly ketones.

Example 6

86 parts of normal hexane ($CH_3$—$CH_2$—$CH_2$—$CH_2$—$CH_2$—$CH_3$) are stirred with 50 parts of phosgene and 260 parts of aluminum bromide free from water during 4 to 6 hours at a temperature of about the freezing point. Then the hydrogen bromide formed is taken off, and the reaction product decomposed by ice. An oil is distilled off by means of steam. 75 parts of this oil are obtained which consists mainly of ketones and which boil at 75°–100° C. (30 mm. mercury).

What is claimed:

1. The process for manufacturing organic products containing oxygen comprising treating a hydrocarbon mass consisting of saturated non-aromatic hydrocarbons containing at least one tertiary carbon atom and non-aromatic hydrocarbons containing no tertiary carbon atoms with phosgene in the presence of aluminum chloride while maintaining the temperature of the reactant mass below normal room temperature, subsequently separating the remaining unreacted components, treating the separated unreacted components comprising essentially hydrocarbons containing no tertiary carbon atoms with phosgene in the presence of an aluminum compound of a non-gaseous halogen while maintaining the temperature of the reactant mass below normal room temperature.

2. A process for manufacturing organic products containing oxygen comprising treating a hydrocarbon mass consisting of saturated aliphatic hydrocarbons a portion of which contain at least one tertiary carbon atom and another portion of which hydrocarbons contain no tertiary carbon atoms with phosgene in the presence of aluminum chloride while maintaining the temperature of the reactant mass below normal room temperature, subsequently separating the remaining unreacted components, treating the separated unreacted components comprising essentially hydrocarbons containing no tertiary carbon atoms with phosgene in the presence of an aluminum compound of a non-gaseous halogen while maintaining the temperature of the reactant mass below normal room temperature.

3. A process of manufacturing organic products containing oxygen comprising treating a saturated hydrocarbon mass consisting of alicyclic components a portion of which hydrocarbons contain at least one tertiary carbon atom and another portion containing no tertiary carbon atoms with phosgene in the presence of aluminum chloride while maintaining the temperature of the reactant mass below normal room temperature, subsequently separating the remaining unreacted components, treating the separated unreacted components comprising essentially hydrocarbons containing no tertiary carbon atoms with phosgene in the presence of an aluminum compound of a non-gaseous halogen while maintaining the temperature of the reactant mass below normal room temperature.

4. The process for manufacturing organic products containing oxygen comprising treating a hydrocarbon mass consisting of saturated non-aromatic hydrocarbons containing at least one tertiary carbon atom and non-aromatic hydrocarbons containing no tertiary carbon atoms with phosgene in the presence of aluminum chloride while maintaining the temperature of the reaction mass below normal room temperature, subsequently separating the remaining unreacted components, decomposing the reacted components by the addition of water and separating the resulting products by steam distillation, treating the separated unreacted components comprising essentially the hydrocarbons containing no tertiary carbon atoms with phosgene in the presence of aluminum bromide while maintaining the temperature of the reactant mass below normal room temperature.

5. The process for manufacturing organic products containing oxygen comprising treating saturated non-aromatic hydrocarbons containing at least one tertiary carbon atom with phosgene in the presence of aluminum chloride, while maintaining the temperature below normal room temperature.

6. The process for producing oxygen containing organic products comprising treating saturated non-aromatic hydrocarbons containing at least one tertiary carbon atom with phosgene in the presence of aluminum chloride while maintaining the temperature of the reacted mass below 5° C.

7. In the manufacture of organic products containing oxygen the step of treating saturated aliphatic hydrocarbons containing at least one tertiary carbon atom, with phosgene in the presence of aluminum chloride, at temperatures below room temperature.

8. In the manufacture of organic products containing oxygen the step of treating saturated alicyclic hydrocarbons containing at least one tertiary carbon atom, with phosgene in the presence of aluminum chloride, at temperatures below room temperature.

9. In the manufacture of organic products containing oxygen the step of treating mixtures of saturated aliphatic and alicyclic hydrocarbons containing at least one tertiary carbon atom, with phosgene in the presence of aluminum chloride, at temperatures below room temperature.

10. In the manufacture of organic products containing oxygen the step of treating mixtures of saturated aliphatic hydrocarbons which contain at least one hydrocarbon containing at least one tertiary carbon atom, with phosgene in the presence of aluminum chloride, and at temperatures below room temperature.

11. In the manufacture of organic products containing oxygen the step of treating mixtures of saturated alicyclic hydrocarbons which contain at least one hydrocarbon containing at least one tertiary carbon atom, with phosgene in the presence of aluminum chloride, and at temperatures below room temperature.

12. In the manufacture of organic products containing oxygen the step of treating mixtures of saturated aliphatic and alicyclic hydrocarbons such mixtures containing at least one hydrocarbon which contains at least one tertiary carbon atom, with phosgene in the presence of aluminum chloride, and at temperatures below room temperature.

13. In the manufacture of products containing oxygen from hydrocarbons the step of treating saturated non-aromatic hydrocarbons containing at least one tertiary carbon atom, with phosgene in the presence of aluminum chloride, at temperatures below room temperature.

ERNA MAGDA IRMGARD SCHAARSCHMIDT,
*Administratrix of the Estate of*
        *Alfred Schaarschmidt, Deceased.*